US009205535B2

(12) United States Patent
Chu

(10) Patent No.: US 9,205,535 B2
(45) Date of Patent: Dec. 8, 2015

(54) VACUUM DEVICE FOR LENS MODULE ASSEMBLY

(71) Applicant: HON HAI PRECISION INDUSTRY CO., LTD., New Taipei (TW)

(72) Inventor: Chih-Hao Chu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 279 days.

(21) Appl. No.: 13/951,481

(22) Filed: Jul. 26, 2013

(65) Prior Publication Data

US 2014/0208560 A1 Jul. 31, 2014

(30) Foreign Application Priority Data

Jan. 25, 2013 (TW) ............................ 102102822 A

(51) Int. Cl.
*B23Q 1/00* (2006.01)
*B25B 11/00* (2006.01)

(52) U.S. Cl.
CPC ......... *B25B 11/007* (2013.01); *Y10T 29/53991* (2015.01)

(58) Field of Classification Search
USPC .................... 29/282, 283; 359/811, 818, 819
See application file for complete search history.

(56) References Cited

U.S. PATENT DOCUMENTS

| | | | | |
|---|---|---|---|---|
| 5,127,692 | A * | 7/1992 | Yakou et al. | 294/2 |
| 7,236,316 | B2 * | 6/2007 | Miki | 359/819 |
| 7,876,512 | B2 * | 1/2011 | Wong et al. | 359/818 |
| 2007/0121222 | A1 * | 5/2007 | Watanabe | 359/811 |

* cited by examiner

*Primary Examiner* — Lee D Wilson
*Assistant Examiner* — Shantese McDonald
(74) *Attorney, Agent, or Firm* — Novak Druce Connolly Bove + Quigg LLP

(57) ABSTRACT

A vacuum device includes a vacuum generator, a guiding pipe, a connection member, and a stand. One end of the guiding pipe is connected to the vacuum generator. One end of the connection member is connected to the other end of the guiding pipe. The other end of the connection member is connected to the stand. The stand includes a top surface, a first sidewall connected to the top surface, and a pressing portion extending outward from the first sidewall. The connection member is supported by the top surface. The stand defines a first hole and a second hole communicating with the first hole. The first hole runs through the top surface and meets the connection member and the guiding pipe. The second hole runs through the first sidewall and the pressing portion.

15 Claims, 1 Drawing Sheet

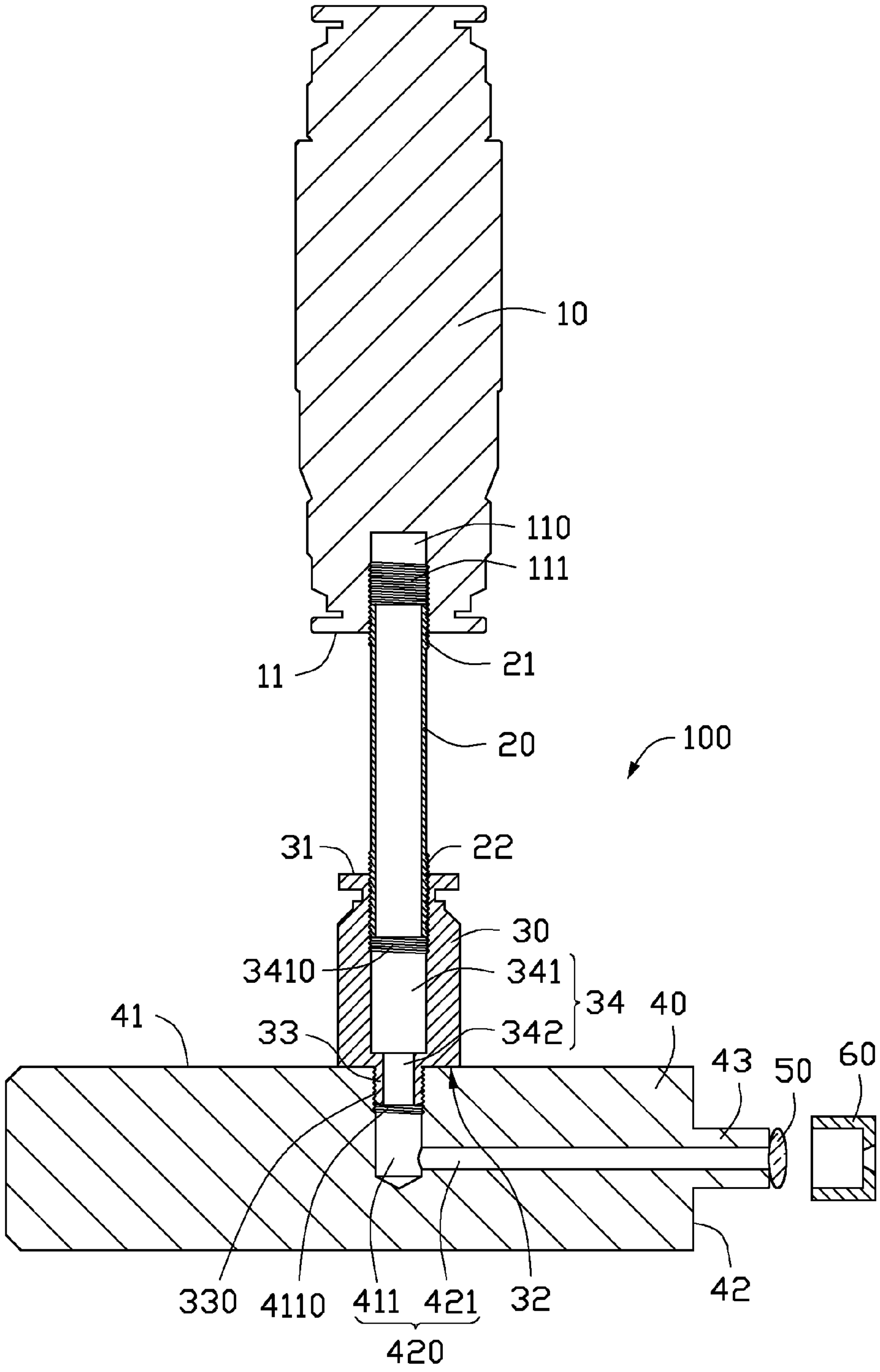
10
110
111
11
21
20
100
31
22
30
3410
341
34
40
41
33
342
43
50
60
330
4110
411
421
32
42
420

VACUUM DEVICE FOR LENS MODULE ASSEMBLY

BACKGROUND

1. Technical Field

The present disclosure relates to vacuum devices, and particularly to a vacuum device for assembling a lens module.

2. Description of Related Art

Lens modules are key members of a camera. A lens module includes a lens barrel with a lens received in the lens barrel. In assembly, firstly, the lens is held by a clip. Then, a circumferential surface of the lens is applied with glue by a glue needle. Finally, the lens is inserted into the lens barrel. However, the lens may be scratched by the clip, which would damage the lens. In addition, it is precision-demanding work to fit the lenses correctly in the lens barrel. Often the precision is low, thereby affecting the quality.

Therefore, it is desirable to provide a vacuum device that can overcome the above-mentioned limitations.

BRIEF DESCRIPTION OF THE DRAWINGS

Many aspects of the present disclosure can be better understood with reference to the following drawing. The components in the drawing are not necessarily drawn to scale, the emphasis instead being placed upon clearly illustrating the principles of the present disclosure.

The FIGURE is a schematic cross-section of a vacuum device, according to an exemplary embodiment.

DETAILED DESCRIPTION

The FIGURE shows a vacuum device 100 configured to assemble a lens 50 into a lens barrel 60.

The vacuum device 100 includes a vacuum generator 10, a guiding pipe 20, a connection member 30, and a stand 40. One end of the guiding pipe 20 is connected to the vacuum generator 10, while the other end of the guiding pipe 20 is connected to one end of the connection member 30. The other end of the connection member 30 is connected to the stand 40.

The vacuum generator 10 includes a connection surface 11. The connection surface 11 defines a receiving cavity 110 for receiving the guiding pipe 20. The vacuum generator 10 includes first internal threads 111 formed on an internal wall of the receiving cavity 110.

The guiding pipe 20 includes first external threads 21 and second external threads 22. The first external threads 21 are formed on one end of the guiding pipe 20. The second external threads 22 are formed on the other end of the guiding pipe 20. The first external threads 21 engage with the first internal threads 111, such that one end of the guiding pipe 20 is received in the receiving cavity 110.

The connection member 30 includes a first connection end 31 and a second connection end 32 away from the first connection end 31. The connection member 30 includes a gas guiding portion 33 extending substantially perpendicularly downward from the second connection end 32 and into the stand 40.

The connection member 30 defines a gas guiding hole 34 running through the first connection end 31, the second connection end 32, and the gas guiding portion 33. The gas guiding hole 34 is stepped, and includes a gap input hole 341 and a gap output hole 342 communicating with the gap input hole 341. Both the gap input hole 341 and the gap output hole 342 are substantially circular. A diameter of the gap input hole 341 is larger than a diameter of the gap output hole 342.

The connection member 30 includes second internal threads 3410 formed on an internal wall of the gap input hole 341. The second internal threads 3410 engage with the second external threads 22, such that the other end of the guiding pipe 20 is received in the gap input hole 341 of the connection member 30.

In the embodiment, the gap output hole 342 is defined in the gas guiding portion 33. The connection member 30 includes third external threads 330 formed on an external wall of the gas guiding portion 33.

The stand 40 includes a top surface 41 connected to the second connection end 32 of the connection member 30, and a first sidewall 42 connected substantially perpendicularly to the top surface 41. The stand 40 includes a pressing portion 43 extending substantially perpendicularly outward from the first sidewall 42. The pressing portion 43 has a shape and size corresponding to an internal portion of the lens barrel 60, such that the pressing portion 43 can be inserted into the internal portion of the lens barrel 60. The stand 40 defines an L-shaped hole 420. The L shaped hole 420 includes a first hole 411 and a second hole 421. The first hole 411 is substantially perpendicular to the second hole 421. The first hole 411 communicates with the second hole 421. The first hole 411 runs substantially perpendicularly through the top surface 41, and communicates with the gas guiding hole 34. The second hole 421 runs through the first sidewall 42 and the pressing portion 43. Both the first hole 411 and the second hole 421 are substantially circular. A diameter of the first hole 411 is larger than a diameter of the second hole 421.

The stand 40 includes third internal threads 4110 formed on an internal wall of the first hole 411. The third internal threads 4110 engage with the third external threads 330, such that the gas guiding portion 33 is received in the first hole 411, and the second connection end 32 is supported by the top surface 41.

In assembly, firstly, one end of the guiding pipe 20 is received in the vacuum generator 10. Then, the other end of the guiding pipe 20 is received in the gas guiding hole 34. Finally, the gas guiding portion 33 of the connection member 30 is received in the first hole 411. Therefore, the connection member 30 is connected to the stand 40.

In use, firstly, the circumferential surface of the lens 50 is coated with glue by a glue needle (not shown). Then, an operator holds the vacuum generator 10 and turns on the vacuum generator 10. The vacuum generator 10 generates vacuum, such that the pressing portion 43 adheres to the lens 50. Finally, the pressing portion 43 is inserted into the lens barrel 60 to glue the lens 50 into the lens barrel 60.

It is noteworthy that, in alternative embodiments, the vacuum generator 10 can be attached to the guiding pipe 20 by an adhesive, by plastic welding, or by other attaching methods.

It is noteworthy that, in alternative embodiments, the guiding pipe 20 can be attached to the connection member 30 by an adhesive, by plastic welding, or by other attaching methods.

It is noteworthy that, in alternative embodiments, the connection member 30 can be attached to the stand 40 by an adhesive, by plastic welding, or by other attaching methods.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A vacuum device for assembling a lens into a lens barrel, the vacuum device comprising:

a vacuum generator;

a guiding pipe, one end of the guiding pipe connected to and communicating with the vacuum generator;

a connection member, one end of the connection member connected to the other end of the guiding pipe, the connection member communicating with the guiding pipe; and a stand, one end of the stand connected to the other end of the connection member, the stand communicating with the connection member, the stand comprising a top surface, a first sidewall connected to the top surface, and a pressing portion extending outward from the first sidewall, the connection member supported by the top surface, the stand defining a hole, the hole comprising a first hole and a second hole communicating with the first hole, the first hole running through the top surface and communicating with the connection member, the second hole running through the first sidewall and the pressing portion.

2. The vacuum device of claim 1, wherein the hole is substantially L shaped, the first hole is substantially perpendicular to the second hole.

3. The vacuum device of claim 1, wherein the vacuum generator comprises a connection surface connected to the guiding pipe, the connection surface defines a receiving cavity, the vacuum generator comprises first internal threads formed on an internal wall of the receiving cavity, the guiding pipe comprises first external threads formed on one end of the guiding pipe, the first external threads engage with the first internal threads, one end of the guiding pipe is received in the receiving cavity.

4. The vacuum device of claim 3, wherein the guiding pipe comprises second external threads formed on the other end of the guiding pipe, the connection member comprises a first connection end and a second connection end away from the first connection end, the connection member comprises a gas guiding portion extending from the second connection end and into the stand, the connection member defines a gas guiding hole running through the first connection end, the second connection end and the gas guiding portion, the connection member comprises second internal threads formed on an internal wall of the gas guiding hole, the second internal threads engage with the second external threads, the other end of the guiding pipe is received in the gas guiding hole.

5. The vacuum device of claim 4, wherein the gas guiding portion extends substantially perpendicularly from the second connection end.

6. The vacuum device of claim 4, wherein the gas guiding hole is stepped, and comprises a gap input hole and a gap output hole communicating with the gap input hole.

7. The vacuum device of claim 6, wherein the second internal threads are formed on an internal wall of the gap input hole.

8. The vacuum device of claim 6, wherein the other end of the guiding pipe is received in the gap input hole.

9. The vacuum device of claim 6, wherein both the gap input hole and the gap output hole are circular, a diameter of the gap input hole is larger than a diameter of the gap output hole.

10. The vacuum device of claim 6, wherein the gap output hole is defined in the gas guiding portion.

11. The vacuum device of claim 10, wherein the connection member comprises third external threads formed on an external wall of the gas guiding portion, the stand comprises third internal threads formed on an internal wall of the first hole, the third internal threads engage with the third external threads, the gas guiding portion is received in the first hole with the second connection end supported by the top surface.

12. The vacuum device of claim 1, wherein both the first hole and the second hole are circular, a diameter of the first hole is larger than a diameter of the second hole.

13. The vacuum device of claim 1, wherein the vacuum generator is attached to the guiding pipe by an adhesive or by plastic welding.

14. The vacuum device of claim 1, wherein the guiding pipe is attached to the connection member by an adhesive or by plastic welding.

15. The vacuum device of claim 1, wherein the connection member is attached to the stand by an adhesive or by plastic welding.

* * * * *